(12) United States Patent
Shin et al.

(10) Patent No.: US 8,400,733 B2
(45) Date of Patent: Mar. 19, 2013

(54) PROCESS TO MAKE PMR WRITER WITH LEADING EDGE SHIELD (LES) AND LEADING EDGE TAPER (LET)

(75) Inventors: Kyusik Shin, Pleasanton, CA (US);
Qiping Zhong, San Jose, CA (US);
Honglin Zhu, Fremont, CA (US);
Yingjian Chen, Fremont, CA (US);
Liubo Hong, San Jose, CA (US);
Fenglin Liu, Milpitas, CA (US)

(73) Assignee: HGST Netherlands B.V., Amsterdam (NL)

( * ) Notice: Subject to any disclaimer, the term of this patent is extended or adjusted under 35 U.S.C. 154(b) by 241 days.

(21) Appl. No.: 12/954,422

(22) Filed: Nov. 24, 2010

(65) Prior Publication Data
US 2012/0127612 A1   May 24, 2012

(51) Int. Cl.
*G11B 5/147* (2006.01)
(52) U.S. Cl. .................................. 360/125.15
(58) Field of Classification Search ............. 360/125.06, 360/125.08, 125.11, 125.12, 125.15, 125.3
See application file for complete search history.

(56) References Cited

U.S. PATENT DOCUMENTS

| | | | |
|---|---|---|---|
| 6,501,619 B1 | 12/2002 | Sherrer et al. | |
| 6,989,972 B1 | 1/2006 | Stoev et al. | |
| 7,038,882 B2 | 5/2006 | Crue et al. | |
| 7,075,756 B1 | 7/2006 | Mallary et al. | |
| 7,133,252 B2 * | 11/2006 | Takano et al. | 360/125.13 |
| 7,140,095 B2 | 11/2006 | Matono | |
| 7,159,302 B2 | 1/2007 | Feldbaum et al. | |
| 7,251,878 B2 | 8/2007 | Le et al. | |
| 7,253,992 B2 | 8/2007 | Chen et al. | |
| 7,375,925 B2 | 5/2008 | Sasaki et al. | |
| 7,392,577 B2 | 7/2008 | Yazawa et al. | |
| 7,417,824 B2 | 8/2008 | Kameda | |
| 7,561,384 B2 | 7/2009 | Osugi et al. | |
| 7,623,324 B2 | 11/2009 | Honda et al. | |
| 7,916,425 B2 * | 3/2011 | Sasaki et al. | 360/125.15 |
| 7,924,528 B2 * | 4/2011 | Sasaki et al. | 360/125.15 |
| 8,233,235 B2 * | 7/2012 | Chen et al. | 360/125.15 |
| 8,274,759 B1 * | 9/2012 | Sasaki et al. | 360/125.13 |
| 8,295,008 B1 * | 10/2012 | Sasaki et al. | 360/125.02 |
| 8,310,787 B1 * | 11/2012 | Sasaki et al. | 360/125.3 |
| 8,320,078 B1 * | 11/2012 | Zeltser et al. | 360/125.12 |
| 2006/0187581 A1 | 8/2006 | Nara et al. | |
| 2006/0279882 A1 | 12/2006 | Honda et al. | |
| 2007/0217069 A1 | 9/2007 | Okada et al. | |
| 2007/0253117 A1 | 11/2007 | Takei et al. | |
| 2008/0112081 A1 | 5/2008 | Matono | |
| 2008/0155810 A1 | 7/2008 | Hong et al. | |
| 2008/0239567 A1 | 10/2008 | Sasaki et al. | |

(Continued)

FOREIGN PATENT DOCUMENTS

| | | |
|---|---|---|
| JP | 2006147023 A | 6/2006 |
| JP | 2009048719 A | 8/2009 |

(Continued)

*Primary Examiner* — Angel A. Castro
(74) *Attorney, Agent, or Firm* — Patterson & Sheridan, LLP (57) ABSTRACT

Methods for fabrication of leading edge shields and tapered magnetic poles with a tapered leading edge are provided. The leading edge shield may be formed by utilizing a CMP stop layer. The CMP stop layer may aid in preventing over polishing of the magnetic material. For the tapered magnetic poles with a tapered leading edge, a magnetic material is deposited on a planarized surface, a patterned resist material is formed, and exposed magnetic material is etched to form at least one tapered surface of the magnetic material.

6 Claims, 11 Drawing Sheets

U.S. PATENT DOCUMENTS

| | | |
|---|---|---|
| 2008/0239585 A1 | 10/2008 | Ousugi et al. |
| 2008/0253035 A1 | 10/2008 | Han et al. |
| 2008/0259498 A1 | 10/2008 | Lengsfield et al. |
| 2008/0266710 A1 | 10/2008 | Kameda et al. |
| 2008/0266724 A1 | 10/2008 | Yazawa et al. |
| 2008/0278853 A1 | 11/2008 | Kameda et al. |
| 2008/0278861 A1 | 11/2008 | Jiang et al. |
| 2008/0278862 A1 | 11/2008 | Kameda et al. |
| 2009/0002885 A1 | 1/2009 | Sin |
| 2009/0122445 A1 | 5/2009 | Jiang et al. |
| 2009/0141406 A1 | 6/2009 | Sasaki et al. |
| 2009/0147410 A1 | 6/2009 | Jiang et al. |
| 2009/0152119 A1 | 6/2009 | Tachibana et al. |
| 2009/0154019 A1 | 6/2009 | Hsiao et al. |
| 2009/0244789 A1 | 10/2009 | Hong et al. |
| 2009/0266790 A1 | 10/2009 | Balamane et al. |
| 2009/0283205 A1 | 11/2009 | Miyazawa et al. |
| 2009/0296275 A1 * | 12/2009 | Sasaki et al. ............... 360/125.3 |
| 2010/0024201 A1 | 2/2010 | Le et al. |

FOREIGN PATENT DOCUMENTS

| | | |
|---|---|---|
| JP | 2009187612 A | 8/2009 |
| JP | 2009199712 A | 9/2009 |
| JP | 2009224000 A | 10/2009 |
| JP | 2009238261 A | 10/2009 |
| JP | 2010033621 A | 2/2010 |
| JP | 2010061735 A | 3/2010 |

* cited by examiner

FIG. 1

(PRIOR ART)

FIG. 2

(PRIOR ART)

PROCESS TO MAKE PMR WRITER WITH LEADING EDGE SHIELD (LES) AND LEADING EDGE TAPER (LET)

BACKGROUND OF THE INVENTION

1. Field of the Invention

Embodiments of the present invention generally relate to leading edge shields and magnetic heads for data recording, and more particularly to a method for manufacturing a leading edge shield and a perpendicular magnetic write head having a tapered write pole.

2. Description of the Related Art

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk, and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head has traditionally included a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs, a GMR or TMR sensor has been employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current there-through. The magnetization of the pinned layer is pinned perpendicular to the air bearing surface (ABS) and the magnetic moment of the free layer is located parallel to the ABS, but free to rotate in response to external magnetic fields.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetizations oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

In a perpendicular magnetic recording system, it is desirable to maximize write field strength and also maximize field gradient. A strong write field ensures that a magnetic bit can be recorded in the magnetically hard top layer of the magnetic medium. A high field gradient allows for fast magnetic switching of the magnetic field from the write pole, thereby increasing the speed with which the magnetic transitions can be recorded.

Some of the problems encountered with perpendicular recording are side writing and side erasure to adjacent tracks on the disk. These problems occur from leakage and fringing of the magnetic flux from the magnetic write head. To minimize these effects, one approach is to provide either a trailing or wrap-around shield on the magnetic write head. The wrap-around shield head has the main pole surrounded on three sides by three shields from the air bearing surface view. These shields allow effective magnetic flux to be provided for writing to the disk, while avoiding leakage and fringing that can lead to the above-described problems. Another solution is to use a slanted pole on the trailing side of a writer. However, both solutions exhibit limitations as higher recording area density are sought for current and future products.

SUMMARY OF THE INVENTION

Embodiments of the present invention generally relate to leading edge shields and magnetic write heads, and more specifically to fabrication of leading edge shields and tapered structures within the magnetic heads.

One embodiment of the invention provides a method for fabricating a magnetic head. The method generally comprises providing a substrate having a first non-magnetic material disposed thereon, a feature definition formed in the first non-magnetic material, and a first magnetic material disposed in the feature definition, wherein the feature definition has a trapezoidal cross-sectional shape and the first magnetic material forms a planar surface in the feature definition, depositing a second magnetic material on the planar surface, forming a patterned resist material on the second magnetic material to expose a portion of the second magnetic material, etching the exposed second magnetic material to form at least one tapered surface of the second magnetic material, removing the patterned resist material, depositing a second non-magnetic material on the second magnetic material having at least one tapered surface, depositing a third non-magnetic material on the second non-magnetic material, and planarizing the second non-magnetic material and the third non-magnetic material to the surface of the second non-magnetic material.

Another embodiment of the invention provides a method for fabricating a magnetic head. The method generally comprises forming a magnetic leading edge shield in a substrate surface, the leading edge shield having a planar surface that tapers from the planar surface to an underlying portion of the substrate surface, depositing a magnetic leading edge material on the leading edge shield material, patterning a resist material on the magnetic leading edge material, wherein the patterned resist material exposes a portion of the magnetic leading edge material, etching the exposed portion of the magnetic leading edge material using the patterned resist material as a mask, wherein the etching removes the exposed portion of the magnetic leading edge material to form one or more tapered surfaces, depositing an etch stop layer over the magnetic leading edge material having one or more tapered surfaces, depositing a bulk fill material over the etch stop layer, and planarizing the bulk fill material to the etch stop layer.

Another embodiment of the invention provides one embodiment of a magnetic head. The magnetic head generally comprises a non-magnetic, electrically insulating material, a leading edge shield formed on the non-magnetic, electrically insulating material, a leading edge taper formed on the leading edge shield with the leading edge taper tapering away from an air bearing surface (ABS) end of the magnetic head, a write pole formed on the leading edge taper and the leading edge shield and having a tapered region having a tapered trailing edge portion and a non-tapered region, wherein a thickness of the tapered region of the write pole increases in a direction away from an air bearing surface (ABS) end of the magnetic head, a first non-magnetic layer formed on the non-tapered region of the magnetic pole, a non-magnetic bump layer formed on the tapered region, wherein the non-magnetic bump layer is adjacent to a sidewall portion of the first non-magnetic layer, a second non-magnetic layer formed on a portion of the tapered region of the write pole that is not covered by the bump layer, and a trailing edge shield formed on the tapered region, wherein the trailing edge shield is separated from the write pole by at least the second non-magnetic layer and the bump layer.

In another embodiment, method of fabricating a leading edge shield is disclosed. The method includes depositing a chemical mechanical polishing stop layer over a substrate, forming a photoresist mask over the chemical mechanical polishing stop layer, and etching at least a portion of the chemical mechanical polishing stop layer and at least a portion of the substrate to form a feature definition. The method also includes removing the photoresist mask to expose the chemical mechanical polishing stop layer, depositing leading edge shield material into the feature definition and over the exposed chemical mechanical polishing stop layer, chemical mechanical polishing the leading edge shield material to expose the chemical mechanical polishing stop layer, and removing the chemical mechanical polishing stop layer.

In another embodiment, a method of fabricating a leading edge shield is disclosed. The method includes forming a photoresist mask over a substrate, etching at least a portion of the substrate to form a feature definition, and removing the photoresist mask to expose the substrate. The method also includes depositing a chemical mechanical polishing stop layer over the substrate and in the feature definition, depositing leading edge shield material over the chemical mechanical polishing stop layer, chemical mechanical polishing the leading edge shield material to expose at least a portion of the chemical mechanical polishing stop layer, and removing the exposed portion of the chemical mechanical polishing stop layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the invention are generally related to leading edge shields and magnetic write heads, and more specifically to methods for fabrication of leading edge shields and tapered magnetic poles. A magnetic pole may have a plurality of tapered surfaces at or near an air bearing surface (ABS), wherein a thickness of the write pole increases in a direction away from the ABS.

Figure 1:
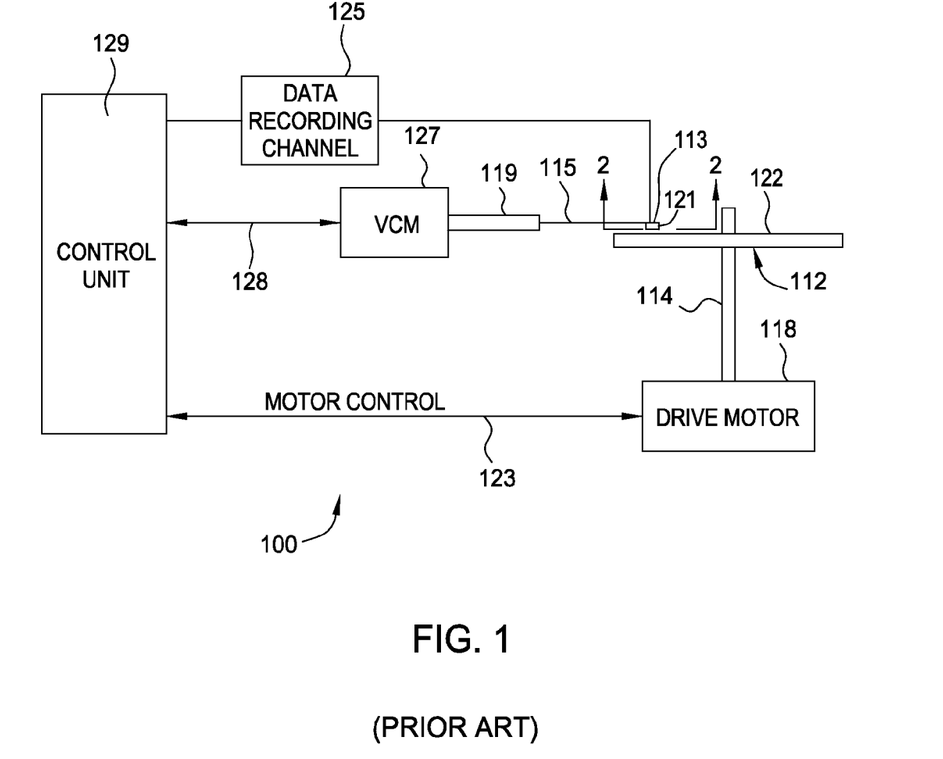
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
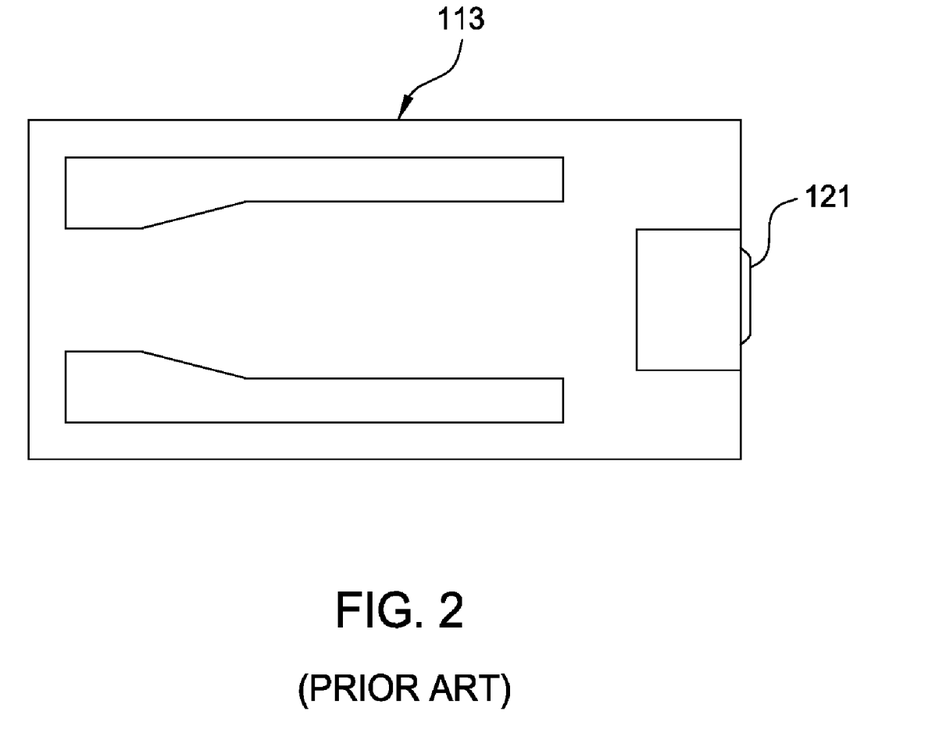
FIG. 2 is an air bearing surface (ABS) view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3:
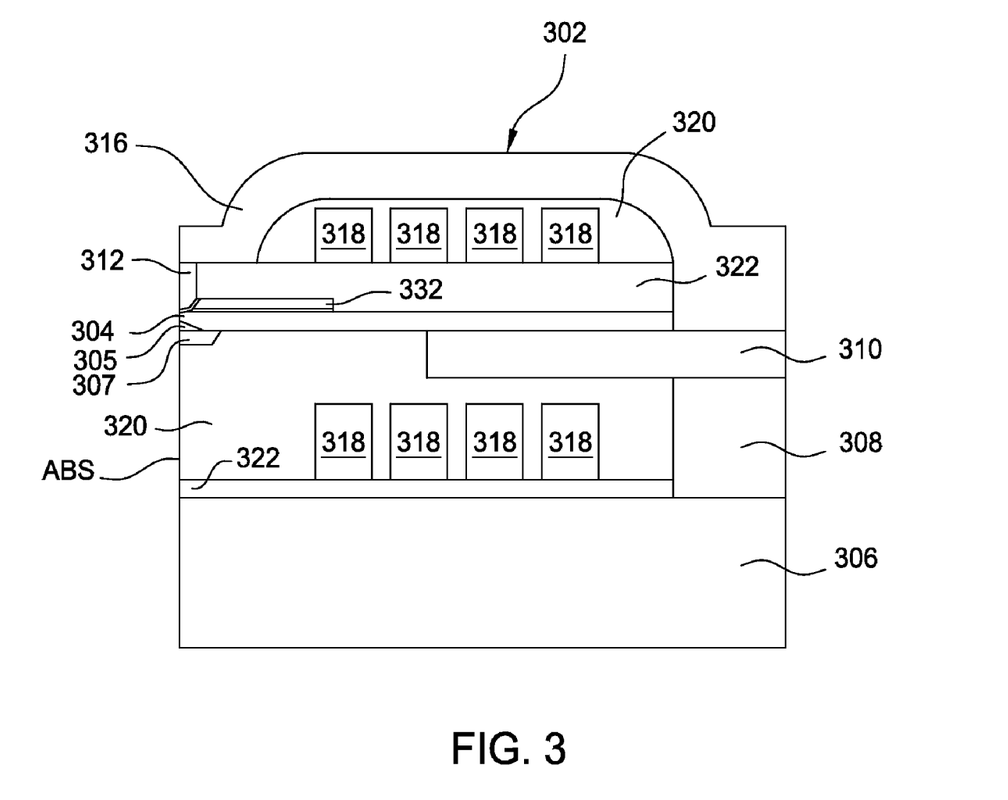
FIG. 3 is a cross sectional view of a magnetic write head according to an embodiment of the present invention.

With reference now to FIG. 3, the invention can be embodied in a magnetic head 302 having a tapered write pole and a tapered leading edge. A non-magnetic bump may also be included in the embodiment as shown in FIG. 3. The magnetic write head 302 includes a magnetic write pole 304 and a magnetic return pole 306. A magnetic back gap layer 308 and magnetic shaping layer 310 magnetically connect the return pole 306 with the write pole 304 at a location removed from an air bearing surface ABS. The magnetic write pole is further defined by a leading edge shield 307 and a leading edge taper 305.

An electrically conductive, non-magnetic write coil 318 passes between the write pole 304 and the return pole 306 and may also pass above the write pole 304. The write coil 318 can sit on top of a non-magnetic, electrically insulating material 322 and is also embedded in a non-magnetic, electrically insulating material 320 such as alumina and/or a hard baked photoresist.

During operation, an electrical current flowing through the coil 318 induces a magnetic field the results in a magnetic flux flowing through the write pole 304. This causes a magnetic field to be emitted from the write pole 304 toward a magnetic medium such as the magnetic medium 122 shown in FIG. 1. This magnetic write field flows through the medium to return to the return pole 306 which has a sufficiently large cross section that it does not erase the magnetic bit written by the write pole 304.

In order to increase the write field gradient (and thereby increase switching speed), the write head 302 also includes a magnetic leading shield 307 having a leading edge taper 305. Additionally, in order to increase the write field gradient (and thereby increase switching speed), the write head 302 also includes a magnetic trailing shield 312. This trailing shield 312 is separated from the write pole 304 by a trailing gap layer 332. The write pole 304 may also be connected with a trailing return pole 316 that connects the trailing shield 312 with the back portion of the write head 302, such as the back portion of the shaping layer 310.

In some embodiments, the first width of the write head is between 20 nm and 150 nm and can taper away from the air bearing surface (ABS) at an angle $\alpha$ with respect to a plane parallel to the ABS surface. In one embodiment $\alpha$ is between about 30° and about 60°.

Figure 4A:
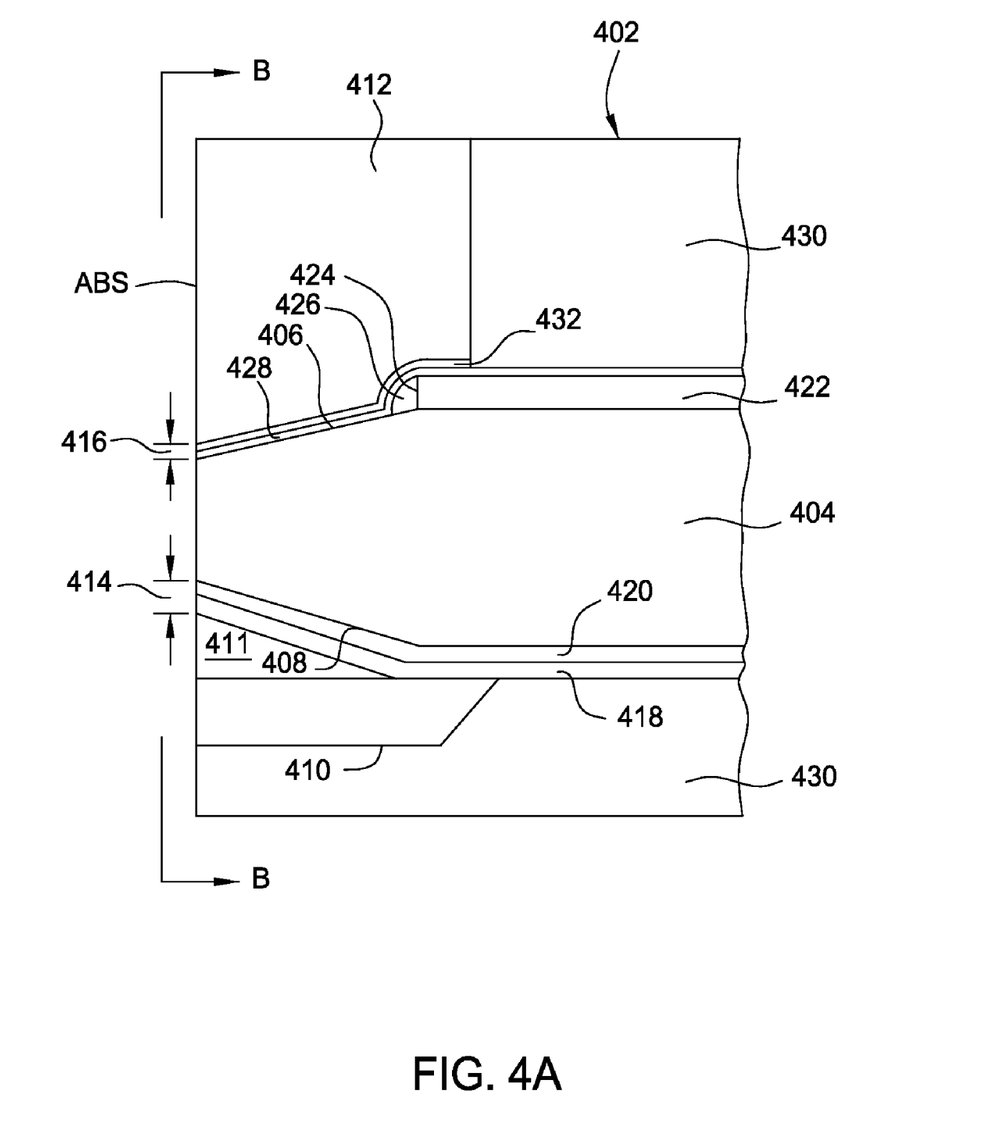
FIG. 4A is a cross sectional view of a pole tip region of a write head according to an alternate embodiment of the invention.
Figure 4B:
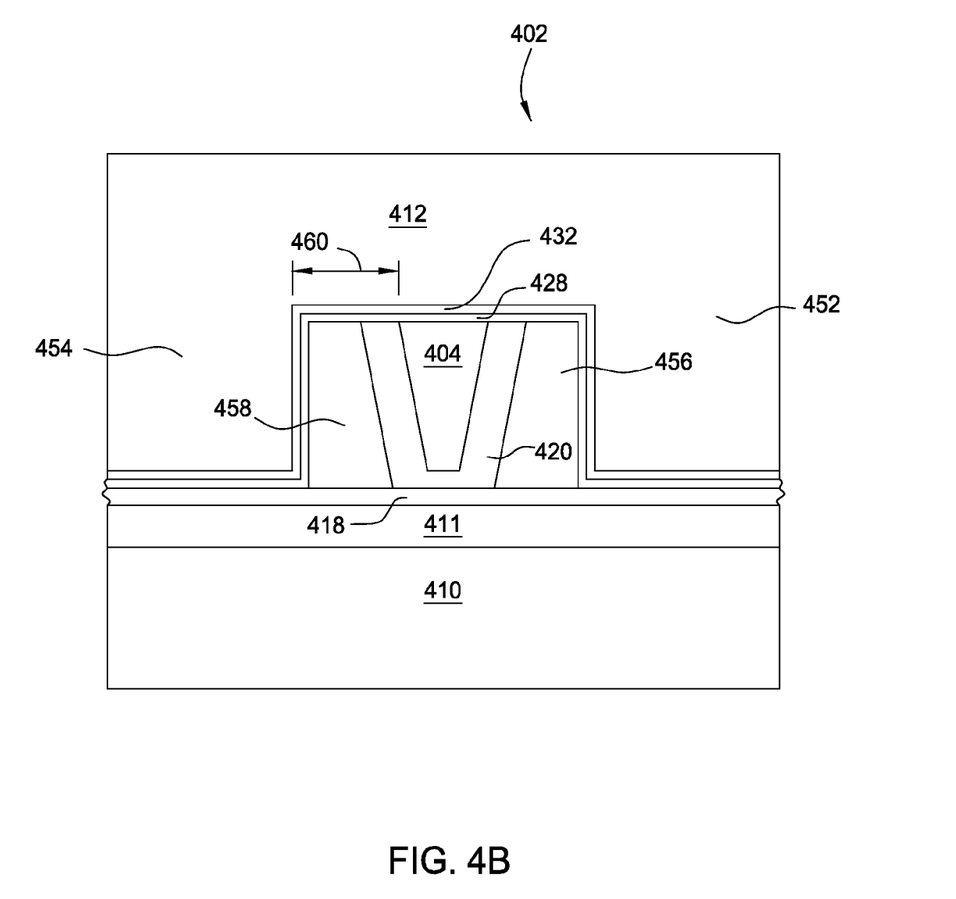
FIG. 4B is an air bearing surface (ABS) view of the write head of FIG. 4A, as viewed from line B-B of FIG. 4A.

With reference now to FIGS. 4A and 4B, a pole tip portion of a write head according to one embodiment of the invention is shown. As shown in FIG. 4A, the write head 402 includes a write pole 404 that has a tapered trailing edge portion 406 (similar to the previously described embodiment), but which also has a tapered leading edge portion 408. Having both tapered trailing and leading edges further optimizes the performance of the write head 402 by focusing magnetic flux to the tip of the write pole 404 while avoiding magnetic saturation of the write pole 404.

The write head 402 has a leading edge shield 410, a magnetic leading edge shield with a leading edge taper 411 as well as a trailing edge shield 412, and a trailing magnetic shield. The leading edge shield 410 is separated from the write pole 404 by a leading gap distance 414, and the trailing edge shield 412 is separated from the trailing edge of the write pole 404 by a trailing gap distance 416, the leading gap distance 414 being significantly larger than the trailing gap distance 416 so as to prevent magnetic write field from being drawn toward the leading edge shield 410 during operation. The leading gap distance 414 is preferably at least twice the trailing gap distance 416, and is more preferably about four times the trailing gap distance 416. In one example, the leading gap distance 414 can be about 100 µm, whereas the trailing gap distance 416 can be about 25 µm.

The leading edge shield 410 is separated from the write pole 404 by first and second nonmagnetic layers 418, 420. The first layer 418 can be constructed of a material such as chromium (Cr) or an alloy of nickel-chromium (NiCr). The second layer 420 can be constructed of a material such as ruthenium (Ru).

The write head also includes a non-magnetic spacer layer 422 which can be constructed of a material such as NiCr and can have a thickness of 50-200 µm. The non-magnetic spacer layer has a front edge 424 that is located a desired distance from the air bearing surface ABS. A non-magnetic bump 426, constructed of a material such as alumina $Al_2O_3$ is formed at the front edge of the non-magnetic spacer layer 422, extending over a portion of the tapered trailing edge 406 of the write pole 404. The non-magnetic spacer layer 422 and non-magnetic bump layer 426 provide additional spacing between the trailing edge shield 412 and the write pole 404 and also optimize the profile of this spacing by providing a smooth transition to this additional spacing.

The write head also includes a non-magnetic trailing gap layer 428 that separates the trailing edge shield 412 from the write pole 404 and which may also extend over the non-magnetic bump 426 and non-magnetic spacer layer 422. The nonmagnetic trailing gap layer can be constructed of a material such as Ruthenium. In addition, non-magnetic, electrically insulating fill layers 430 may be provided behind the shields 410, 412, although structures could be included in these regions as well. Also, a high magnetic moment seed layer 432 such as cobalt-iron (CoFe) may be included at the bottom of the trailing edge shield 412 to improve the performance of the trailing shield.

FIG. 4B shows the write head 402 as viewed from the air bearing surface. As can be seen in FIG. 4B, the trailing edge shield 412 extends downward beyond the sides of the write pole to form side shielding portions 452, 454. For this reason, the trailing edge shield 412 can also be referred to as a "wrap-around" shield. Write head also includes non-magnetic insulating side fill layers 456, 458 that (for reasons that will become apparent below) are preferably constructed of a reaction ion etchable (RIEable) material such as $SiO_2$ or alumina. It also can be seen, that the non-magnetic side fill layers have substantially vertical outer sides, and that the layer 420 discussed above with reference to FIG. 4A, also extends up the sides of the write head (also for reasons that will become apparent below). The thickness of the layers 420, 456, 428, 432 define the side gap distance 460.

It can be seen in FIG. 4B, that the layers 418 and 428 extend between the trailing edge shield 412 and the leading edge shield 410 so that the shields 412, 410 do not contact one another. In another embodiment of the invention, the layers 418 and 428 terminate at some point away from the write pole 404 so that the trailing edge shield 412 and leading edge shield 410 make magnetic contact at regions beyond the layers 418,428. This embodiment can improve the performance of the trailing edge shield 412 by improving the flow of magnetic flux from the trailing edge shield 412.

FIGS. 5A through 8G describe embodiments of methods for manufacturing a magnetic write head according to the various embodiments described above with reference to FIG. 3 and FIGS. 4A-4B.

FIGS. 5A-5G illustrate exemplary steps performed during fabrication of a leading edge taper of a write pole according to an embodiment of the invention.

Figure 5A:
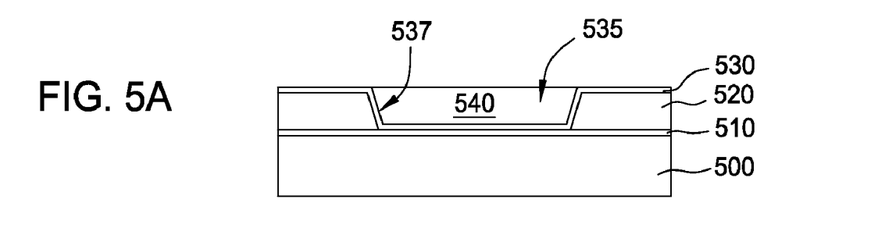
FIGS. 5A-5G illustrate an exemplary method for forming a leading edge shield and leading edge taper for a flared write pole according to an embodiment of the invention.

As illustrated in FIG. 5A, in one embodiment, fabrication of the structure may begin by providing a substrate material 500. The substrate material 500 may be composed of a non-magnetic material, such as aluminum oxide ($Al_2O_3$), also known as "alumina". While not shown in the Figures, the substrate material 500 may include one or more other components of a magnetic head, e.g., a read head and one or more components of a write head already formed therein. Additionally, while not shown, the substrate material 500 may include a reaction ion etchable stop layer (310 above) disposed therein to form the bottom of any feature definition. Substrate material 500 may correspond to insulating material 320 of FIG. 3. In an alternative embodiment, the substrate material 500 may be a magnetic material as described herein.

A layer of material 510 that is resistant to reactive ion etching (RIE), a RIE stop layer, is deposited over the substrate. The RIE stop layer 510 can be a non-magnetic material such as tantalum (Ta), tantalum nitride (TaN), titanium (Ti), titanium nitride (TiN), chromium (Cr), an alloy of nickel and chromium (NiCr), ruthenium (Ru), and combinations thereof, or laminated layers of these materials.

A fill layer 520 is deposited over the material layer 510. The fill layer 520 may be a reactive ion etchable (RIEable) material, for example, alumina ($Al_2O_3$), silicon dioxide ($SiO_2$), silicon nitride, and is deposited at least as thick as the desired thickness of a desired write pole thickness, as will become apparent below.

A feature definition 535 may be formed in the reactive ion etchable material (RIEable) of the fill layer 520 by a reactive ion etching (RIE) process, such as ion beam etching (IBE). The reactive ion etching (RIE) process is preferably performed at one or more angles relative to normal to form the fill layer 520 with the feature definition 535 having tapered side walls 537. The one or more angles are from 10° to 60° relative to normal and are angled outward from the bottom of the feature definition to the top of the feature definition. Such a structure provides for a tapered structure from the surface into the material 520, which can form a trapezoidal shape.

A non-magnetic material 530, which may be a polishing stop material as described in FIGS. 6A-6E, may be deposited by a conformal deposition process such as atomic layer deposition. This non-magnetic material 530 may be a non-magnetic material including tantalum (Ta), tantalum nitride (TaN), titanium (Ti), titanium nitride (TiN), chromium (Cr), an alloy of nickel and chromium (NiCr), ruthenium (Ru), and combinations thereof, or laminated layers of these materials, and may be deposited to a sufficient thickness to advantageously reduce the width of the trench in order to shrink the track width of the yet to be formed write pole.

Then, a magnetic material 540, such as cobalt-iron (CoFe) or cobalt-nickel-iron (CoNiFe), may be deposited, such as by electroplating, into the feature definition 535 formed in the fill layer 520. The magnetic material 540 forms the leading edge shield material of the structure for a later main pole structure. A chemical mechanical polishing (CMP) process may be performed to planarize the magnetic layer 540, leaving a structure as shown in FIG. 5A, with a write pole material 540 in the feature definition 535. An ion milling may then also be performed to remove portions of the non-magnetic layer 535 that may extend over the fill layer 520.

Figure 5B:
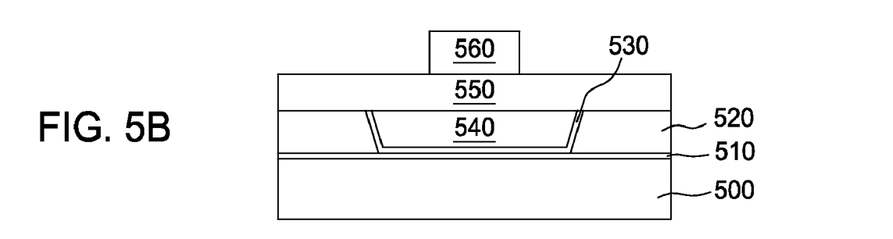

Referring to FIG. 5B, a magnetic material 550, which will be a lead edge taper material, is then conformally deposited, such as by a sputtering process, on the planarized surface of the fill layer 520, non-magnetic material 530, and magnetic material 540. The magnetic material 550 is a metal alloy selected from the group of nickel-iron (NiFe), cobalt-iron (CoFe), cobalt-nickel-iron (CoNiFe), and combinations thereof. The magnetic material 550 may the same material or a different material from the magnetic layer 540. The magnetic material 550 may be deposited by a sputtering process, and may be deposited to a thickness from about 500 Å to about 1500 Å, for example about 1100 Å. A photoresist/resist material 560 is then deposited and patterned on the magnetic material 550.

Figure 5C:
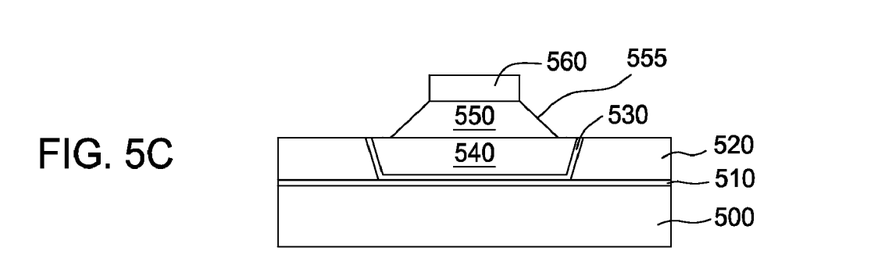

Referring to FIG. 5C, an ion milling process or a reactive ion etch process, such as a ion beam etching (IBE) process, may be performed to remove portions of the magnetic layer 550 exposed by the patterned photoresist/resist material 560. The ion milling is performed to remove a portion of the magnetic material layer 550 at a preferred angle, thereby allowing the formation of a tapered surface 555 on the magnetic material layer 550. Additionally, the magnetic layer may be ion milled to provide for the tapered material having the end of the taper portions be within the horizontal surface bounds of the underlying magnetic material 540 as shown in FIG. 5C. In one embodiment, the magnetic material layer 550 has a tapered portions coupled only to the underlying magnetic material 540 on the substrate surface.

The ion milling is performed at one or more angles relative to normal, such that shadowing from the patterned photoresist/resist layer 560 causes the tapered surface to form an angle from 10 to 60 degrees, such as from 20 to 40 degrees, for example, about 30 degrees with respect to a plane that is parallel with the surfaces of the as deposited layers. The tapered structure forms the leading edge taper structure. As shown on the Figures, the leading edge taper may have more than one tapered side, and each side may have the same or substantially the same angles. If any non-magnetic material 550 was disposed on the surface of the layers (not shown), the non-magnetic material 530 may be removed with the ion milling process.

Figure 5D:
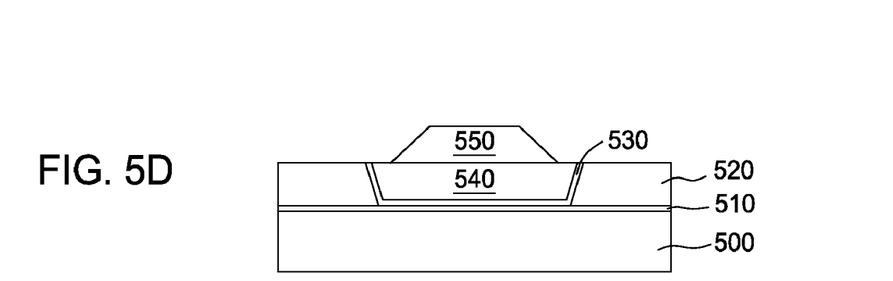

Referring to FIG. 5D, the patterned photoresist/resist material 560 is then removed from the magnetic layer 550. The patterned photoresist/resist material 560 may be removed by a liftoff or ashing process.

Figure 5E:
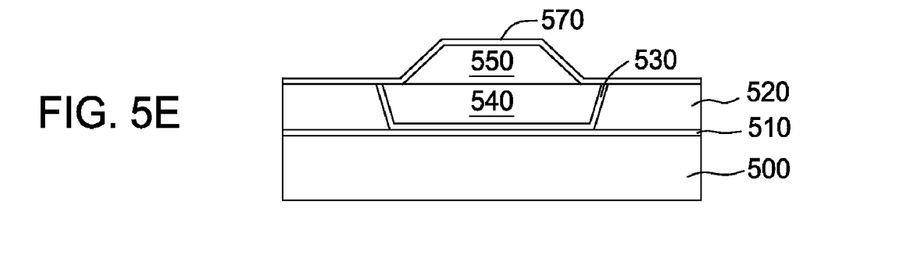

Referring to FIG. 5E, a non-magnetic layer 570 is conformally deposited over the magnetic material layer 550 and the exposed surfaces of the fill layer 520, non-magnetic material 530, and magnetic material 540. The non-magnetic layer 570 may be a reactive ion etching (RIE) stop layer and may be a non-magnetic material including tantalum (Ta), tantalum nitride (TaN), titanium (Ti), titanium nitride (TiN), chromium (Cr), an alloy of nickel and chromium (NiCr) ruthenium (Ru), and combinations thereof, or laminated layers of these materials. The non-magnetic layer 570 may be deposited to a thickness of 40-60 μm or about 50 μm.

Figure 5F:
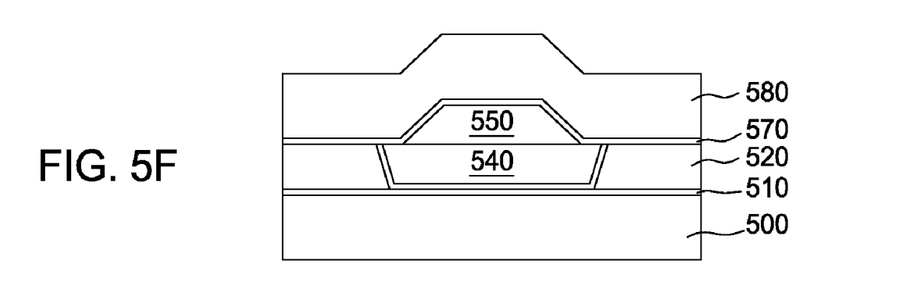

Referring to FIG. 5F, a bulk layer 580 of a non-magnetic material, such as alumina, may be deposited over the conformal non-magnetic RIE stop layer 570.

The bulk layer 580 (and optionally, the non-magnetic RIE stop layer 570) may then be planarized. The substrate material 500 and bulk layer 580 may be of the same material, and may comprises a material selected from the group of alumina ($Al_2O_3$), silicon oxide, silicon nitride, an combinations thereof, amongst other dielectric materials. The formed structure may then provide for main pole processing.

Figure 5G:
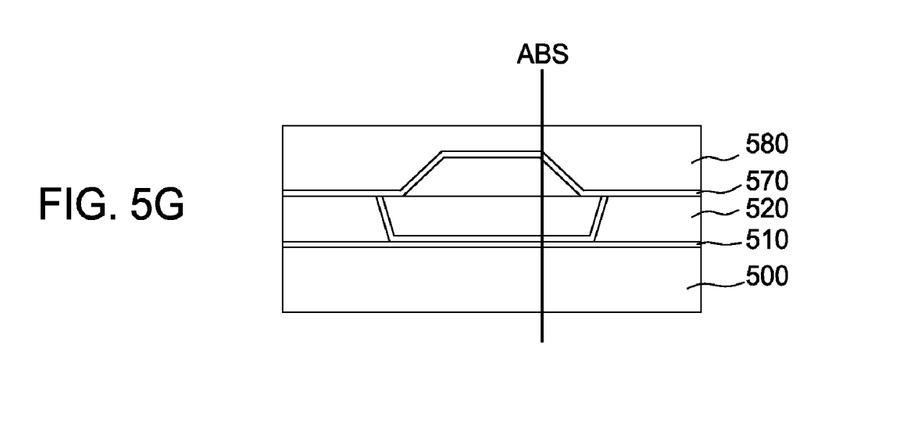

FIG. 5G, illustrates the layering structure after the air bearing surface process which shows the leading edge shield portion 340 and the leading edge taper portion 355 containing the ABS allowing for the formation of the write pole with a leading tapered surface as shown in FIG. 3.

The structure formed in FIG. 5A, may be formed by several different processes, of which two embodiments can be described as follows with reference to FIGS. 6A-6E and FIGS. 7A-7E, respectively.

One manner to form the leading edge shield comprises depositing a seed layer over a substrate. The seed layer may be deposited by conventional deposition techniques such as electroplating or sputtering. A photoresist mask is then formed which leaves select areas of the seed layer exposed. The magnetic material is then deposited onto the exposed areas of the seed layer. The mask may then be removed, as well as the exposed seed layer that underlies the mask. The removal may occur utilizing ion beam milling to expose the underlying substrate. A layer of $Al_2O_3$ may then be formed over the exposed surfaces which include portions of the substrate and the magnetic material. The $Al_2O_3$ may then be planarized back using a CMP process to expose the magnetic material, which is also polished at least partially. The process flow is simple, but can not achieve the desired uniformity for the preferred 0.1 to 0.3 micron thickness of the leading edge shield and hence, has no manufacturability. In contrast, the process flow discussed below in regards to FIGS. 6A-6E includes depositing a CMP stop layer, photo pattern, etch, refill, CMP and light mill to provide a better leading edge shield thickness mean and uniformity control. The process flow discussed below in regards to FIGS. 7A-7E involves etching, refilling with a stop layer and leading edge shield material, then CMP and light ion beam etching. The process flow for FIGS. 6A-6E will leave no process signature of the CMP stop layer while the process flow for FIGS. 7A-7E will have the process signature of a CMP stop layer. The leading edge shield, for both FIGS. 6A-6E and FIGS. 7A-7E are fabricated after the reader is completed. The leading edge shield is fabricated with a throat height length ranging from about 0.2 microns to about 0.3 microns. The thickness of the leading edge shield is between about 0.1 microns and about 0.3 microns. The magnetic material for the leading edge shield may comprise soft magnetic materials such as NiFe, CoNiFe, and CoFe.

Referring to FIGS. 6A-6E, the structure of FIG. 5A may be formed by first providing a substrate material 600. The substrate material 600 may be composed of a non-magnetic material, such as aluminum oxide ($Al_2O_3$), also know as "alumina". While not shown in the Figures, the substrate material 600 may include one or more other components of a magnetic head, e.g., a read head and one or more components of a write head already formed therein. Additionally, while not shown, the substrate material 600 may include a reaction ion etchable layer stop layer (310 above) disposed therein to form the bottom of any feature definition. Substrate material 600 may correspond to insulating material 320 of FIG. 3. In an alternative embodiment, the substrate material 600 may be a magnetic material as described herein.

Figure 6A:
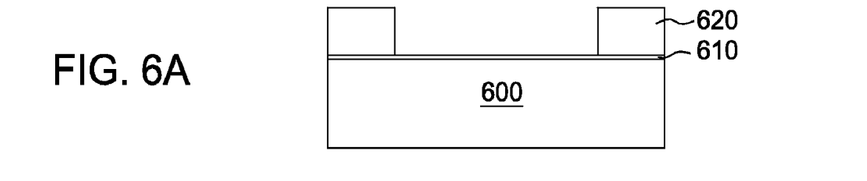
FIGS. 6A-6E illustrate one embodiment of a method for forming a leading edge shield according to an embodiment of the invention.

A layer of material 610 that is resistant to chemical mechanical polishing (CMP), a CMP resistance material (or CMP stop layer), is deposited over the substrate. The CMP resistance material 610 may be a material selected from the group consisting of iridium (Ir), ruthenium (Ru), Rhodium (Rh), tantalum (Ta), and combinations thereof, and is preferably a non-magnetic material. The CMP resistance material 610 may be deposited to a thickness from 100 Å to 500 Å. A photoresist material 620 is then deposited and patterned on the CMP resistance material 610.

Figure 6B:
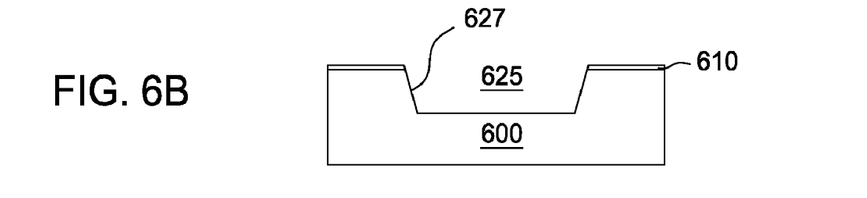

Referring to FIG. 6B, a feature definition 625 may be formed in the substrate material 600 by reactive ion etching (RIE) or ion beam etching (IBE) the exposed CMP resistance material 610 and the underlying substrate material 600. The reactive ion etch process is preferably performed at one or more angles relative to normal to form the feature definition 625 having tapered side walls 627. The one or more angles are from 10° to 60° relative to normal and are angled outward from the bottom of the feature definition to the top of the feature definition. The photoresist/resist material 620 is also removed after the etching process, such as by a liftoff or ashing process. The feature definition is formed having a depth (or thickness) from 0.1 μm to 0.3 μm.

Figure 6C:
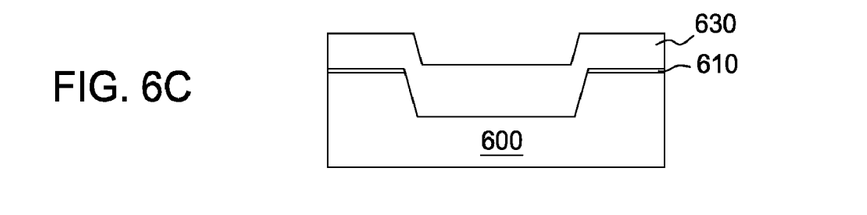

A magnetic material 630, such as cobalt-iron (CoFe) of cobalt-nickel-iron (CoNiFe), may be deposited on the CMP stop layer 610 and into the feature definition 625 formed in the substrate material 600 as shown in FIG. 6C. The magnetic material 630 may be deposited by a plating process, such as electroplating, or a physical vapor deposition (sputtering) process.

Figure 6D:
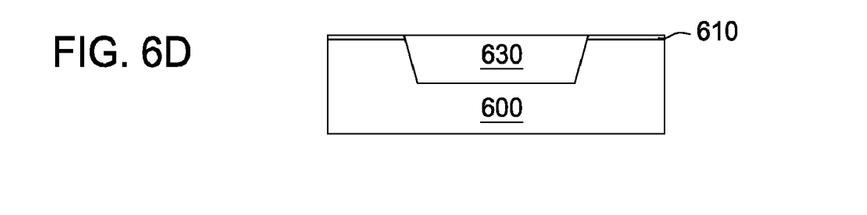

A planarization process, such as by a chemical mechanical polishing (CMP) process, may be performed to remove the magnetic layer 630 deposited over the CMP stop layer 610 and planarize the magnetic layer 630 to the CMP resistance material 610, leaving a structure shown in FIG. 6D, which is in essence a leading edge shield formed in the feature definition 625.

Figure 6E:
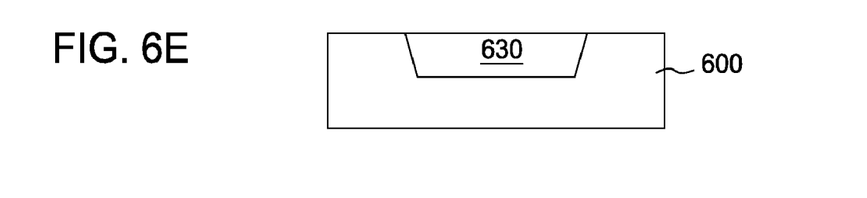

An ion milling, such as by a light ion beam etching process (IBE) or sputter etching process may then also be performed to remove portions of the CMP resistance material 610 still remaining after the planarization process as shown in FIG.

6E. The ion milling can be skipped if a LET process is used further down the line. The ion milling may remove between about 100 Angstroms and about 500 Angstroms.

Referring to FIGS. 7A-7E, the structure may be formed by first providing a substrate material 700. The substrate material 700 may be composed of a non-magnetic material, such as Aluminum Oxide ($Al_2O_3$), also know as "alumina". While not shown in the figures, the substrate material 700 may include one or more other components of a magnetic head, e.g., a read head and one or more components of a write head already formed therein. A photoresist/resist material 720 is then deposited and patterned on the substrate material 700. Additionally, while not shown, the substrate material 700 may include a reaction ion etchable layer stop layer (310 above) disposed therein to form the bottom of any feature definition. Substrate material 700 may correspond to insulating material 320 of FIG. 3. In an alternative embodiment, the substrate material 700 may be a magnetic material as described herein.

Figure 7A:
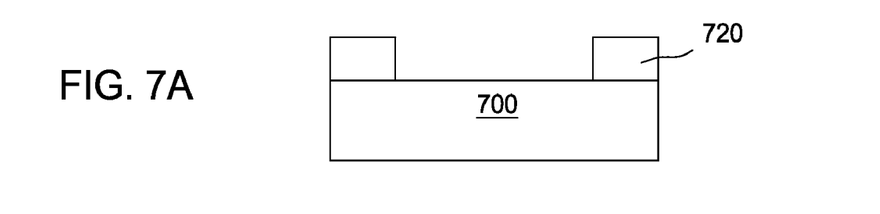
FIGS. 7A-7E illustrate another embodiment of a method for forming a leading edge shield according to an embodiment of the invention.
Figure 7B:
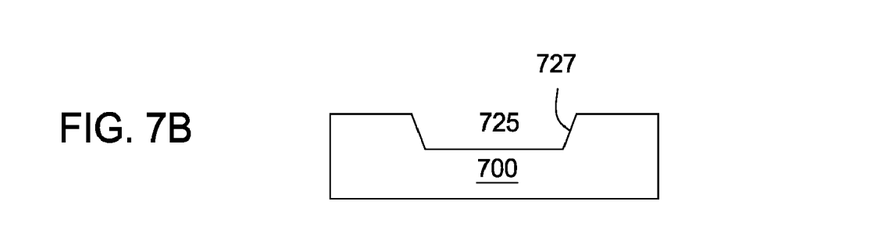

Referring to FIG. 7B, a feature definition 725 may be formed in the substrate material 700 by reactive ion etching (RIE) or ion beam etching (IBM) the exposed substrate material 700. The reactive ion etch process is preferably performed at one or more angles relative to normal to form the feature definition 725 having tapered side walls 727. The one or more angles are from 10° to 60° relative to normal and are angled outward from the bottom of the feature definition 725 to the top of the feature definition 725. The feature definition 725 is formed having a depth (or thickness) from 0.1 µm to 0.3 µm. The photoresist/resist material 720 is also removed after the etching process, such as by a liftoff or ashing process.

Figure 7C:
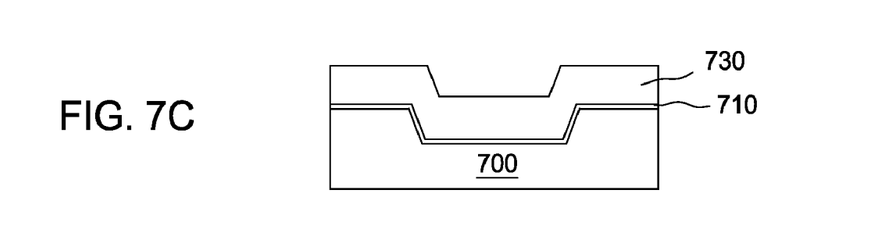

Referring to FIG. 7C, a layer of material that is resistant to chemical mechanical polishing (CMP), a CMP resistance material 710 (or CMP stop layer), is deposited over the substrate and in the feature definition conformally. The CMP resistance material 710 may be a material selected from the group consisting of iridium (Ir), ruthenium (Ru), Rhodium (Rh), tantalum (Ta), and combinations thereof, and is preferably a non-magnetic material. The CMP resistance material 710 may be sputter deposited to a thickness from 100 Å to 500 Å.

A magnetic material 730, such as cobalt-iron (CoFe) or cobalt-nickel-iron (CoNiFe), may be deposited onto the CMP resistance material 710 and into the feature definition 725 formed in the substrate material 700 as shown in FIG. 7C. The magnetic material 730 may be deposited by a plating process, such as electroplating, or a physical vapor deposition (sputtering) process.

Figure 7D:
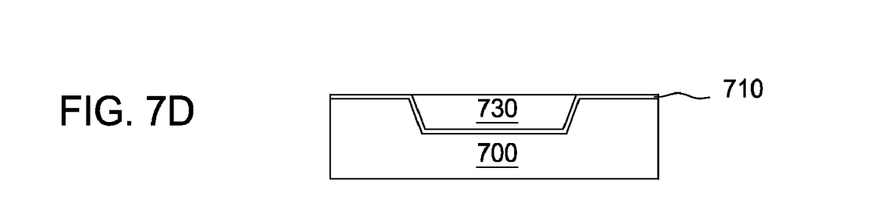

A planarization process, such as by a chemical mechanical polishing (CMP) process, may be performed to remove and planarize the magnetic layer 730 to the CMP resistance material 710, leaving a structure shown in FIG. 7D, which is in essence a leading edge shield formed in the feature definition 725.

Figure 7E:
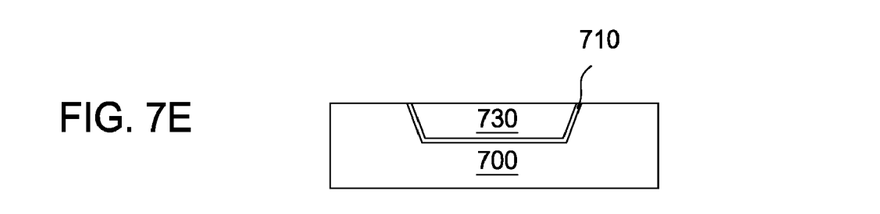

An ion milling, such as by a light ion beam etching process (IBE) may then also be performed to remove portions of the CMP resistance material 710 still remaining after the planarization process as shown in FIG. 7E.

The process flows shown in FIGS. 6A-6E and 7A-7E are comparable. The process flow in FIGS. 6A-6E will leave no process signature of a CMP stop layer while the process flow in FIGS. 7A-7E will have a process signature of a CMP stop layer. A Cr/NiCr RIE stop layer may be deposited on the leading edge shield after the leading edge shield is completed to make a perpendicular write head with a four side wrap-around shield but without the leading edge taper. After the leading edge shield is done, the leading edge taper can also be built upon the leading edge shield so that the perpendicular write head will have both a leading edge shield and a leading edge taper.

Referring to FIGS. 8A-8F, one embodiment of forming a main pole on the write material is as follows.

Figure 8A:
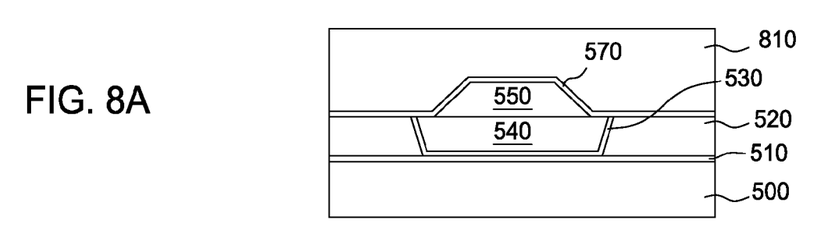
FIGS. 8A-8F illustrate one embodiment of a method for forming the main pole in addition to the write pole according to an embodiment of the invention.

The non-magnetic fill material 380 as shown in FIG. 5F is removed. An optional non-magnetic step layer, preferably constructed of NiCr may be deposited over the non-magnetic layer 570 (non-magnetic reactive ion etching (RIE) stop layer) and the leading edge taper material 555. The pole material 810 may then be deposited and planarized. The pole material 810 may comprise a magnetic material as described herein.

Figure 8B:
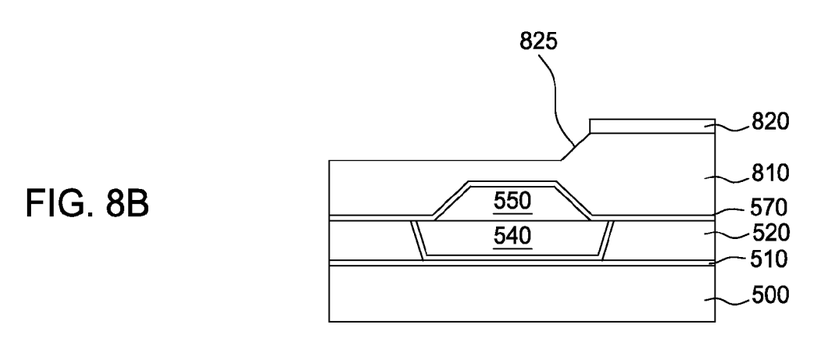

A non-magnetic step layer 820, preferably constructed of NiCr is deposited over the pole material 810. A mask layer and/or a photoresist/resist layer (not shown) are deposited and patterned over the non-magnetic step layer 820 and the pole material 810. The non-magnetic step layer 820 and the pole material 810 are then etched and patterned by an ion milling process to form an upper tapered surface 825. Any mask or photoresist/resist material are then removed to provide the structure as shown in FIG. 8B.

Figure 8C:
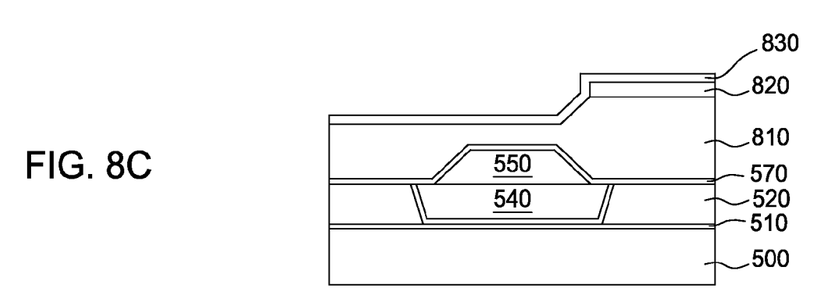

A layer of non-magnetic material 830, such as alumina, is deposited by a conformal deposition process such as atomic layer deposition or chemical vapor deposition as shown in FIG. 8C.

Figure 8D:
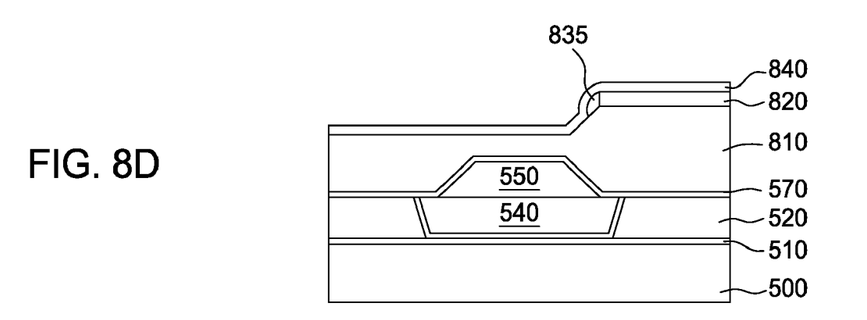

Then, an ion milling is performed to preferentially remove horizontally disposed portions of the alumina layer, leaving an alumina bump 835 at the front edge of the non-magnetic step layer 820. A layer of non-magnetic material 840 is deposited to a thickness to define a desired trailing gap thickness as shown in FIG. 8D. The trailing gap layer 840 can be constructed of ruthenium and other non-magnetic materials. A non-magnetic, electrically insulating material 860, such as alumina 860, may then be deposited on the trailing gap layer 840.

Figure 8E:
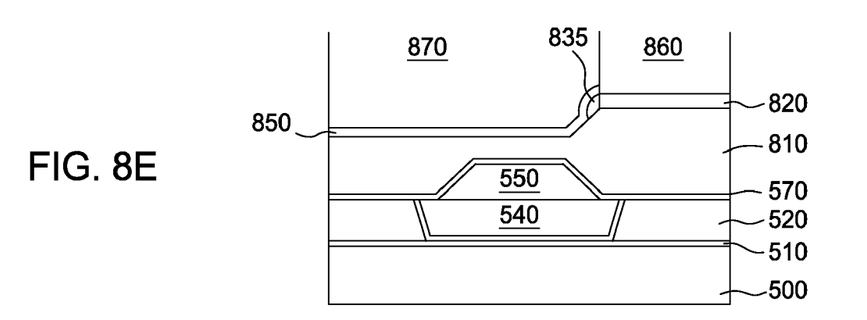
Figure 8F:
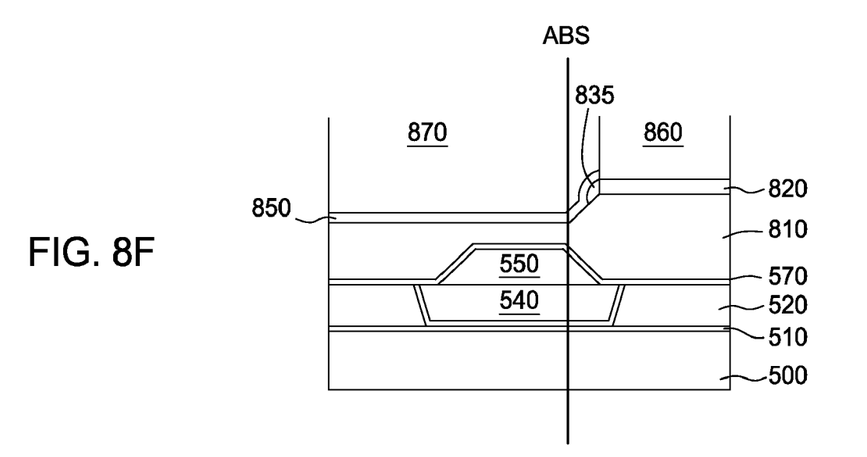

Referring to FIG. 8E, the non-magnetic, electrically insulating material 860 may then be etched to expose a portion of the trailing gap layer 840 formed from the air bearing surface to a portion along the substantially horizontal portion of the trailing gap layer 840. An optional high magnetic moment seed layer 850 may be deposited and patterned on the exposed trailing gap layer 840. A trailing shield 870 may be deposited on the high magnetic seed layer 850. The high magnetic moment seed layer 850 may be provided at the leading edge of the trailing shield 870 (312) to maximize the performance of the trailing shield.

Additional structures, such as a trailing return pole, additional non-magnetic, electrically insulating material, and coils may be formed on the structure to form the head structure. The structure may then be processed to form an air bearing surface, as shown by line ABS formed through the structure in FIG. 8F to form the structure as shown in FIG. 3.

While the foregoing is directed to embodiments of the present invention, other and further embodiments of the invention may be devised without departing from the basic scope thereof, and the scope thereof is determined by the claims that follow.

What is claimed is:

1. A magnetic head, comprising:
   a non-magnetic, electrically insulating material;
   a leading edge shield formed on the non-magnetic, electrically insulating material;
   a leading edge taper formed on the leading edge shield with the leading edge taper tapering away from an air bearing surface end of the magnetic head;

a write pole formed on the leading edge taper and the leading edge shield and having a tapered region having a tapered trailing edge portion and a non-tapered region, wherein a thickness of the tapered region of the write pole increases in a direction away from an air bearing surface end of the magnetic head;

a first non-magnetic layer formed on the non-tapered region of the magnetic pole;

a non-magnetic bump layer formed on the tapered region, wherein the non-magnetic bump layer is adjacent to a sidewall portion of the first non-magnetic layer;

a second non-magnetic layer formed on a portion of the tapered region of the write pole that is not covered by the bump layer; and a trailing edge shield formed on the tapered region, wherein the trailing edge shield is separated from the write pole by at least the second non-magnetic layer and the bump layer.

2. The magnetic head of claim 1, wherein the leading edge shield and the leading edge taper each comprise a magnetic material the group consisting of nickel-iron, cobalt-nickel-iron, and combinations thereof.

3. The magnetic head of claim 1, wherein the leading edge taper comprises a tapered surface having an tapering angle between 10 degrees and 60 degrees from a direction normal to the air bearing surface.

4. The magnetic head of claim 1, wherein the tapered region of the write pole comprises a tapered surface, wherein the tapered surface has an angle between 20 degrees and 45 degrees from a direction normal to the air bearing surface.

5. The magnetic head of claim 1, wherein the write pole has a maximum thickness between 120 nm and 350 nm, and a minimum thickness between 60 nm and 200 nm at the ABS.

6. The magnetic head of claim 1, wherein the bump player has a curved surface extending from a top surface of the first non-magnetic layer to the tapered region of the write pole.

* * * * *